US005634546A

United States Patent [19]

Ostermeier et al.

[11] Patent Number: 5,634,546

[45] Date of Patent: Jun. 3, 1997

[54] NEWEL GUIDE FOR A HANDRAIL

[75] Inventors: Jörg Ostermeier, Stadthagen; Knuth Wallbaum, Wunstorf; Bernward Engelke, Stadthagen, all of Germany

[73] Assignee: Otis Elevator Company, Farmington, Conn.

[21] Appl. No.: 497,272

[22] Filed: Jun. 30, 1995

[51] Int. Cl.[6] .......... B65G 17/00

[52] U.S. Cl. .......... 198/335

[58] Field of Search .......... 198/335

[56] References Cited

U.S. PATENT DOCUMENTS

| | | | |
|---|---|---|---|
| 4,932,512 | 6/1990 | Rivera | 198/335 X |
| 5,033,607 | 7/1991 | Rivera | 198/335 |
| 5,131,520 | 7/1992 | Johnson et al. | 198/335 |
| 5,181,595 | 1/1993 | Tietze et al. | 198/335 |
| 5,366,061 | 11/1994 | Kruse et al. | 198/335 |
| 5,477,954 | 12/1995 | Greutter et al. | 198/335 |

FOREIGN PATENT DOCUMENTS

| | | | |
|---|---|---|---|
| 2006706 | 5/1979 | United Kingdom | 198/335 |
| 2053126 | 2/1981 | United Kingdom | 198/335 |

*Primary Examiner*—James R. Bidwell

[57] ABSTRACT

A newel guide for supporting a passenger conveyor handrail traveling over a newel includes an integral one piece body and a plurality of rollers. The one piece body may be formed by an extrusion process and formed into the desired shape. In a particular embodiment, the one piece body incorporates an attachment portion, a deflector portion and a portion to retain the rollers. A transition piece is used between the newel guide and the handrail guide to smoothly transition between the guides. The transition piece has a profile to match the newel guide on one end and a profile to match the handrail guide on the opposite end.

10 Claims, 2 Drawing Sheets

FIG. 2
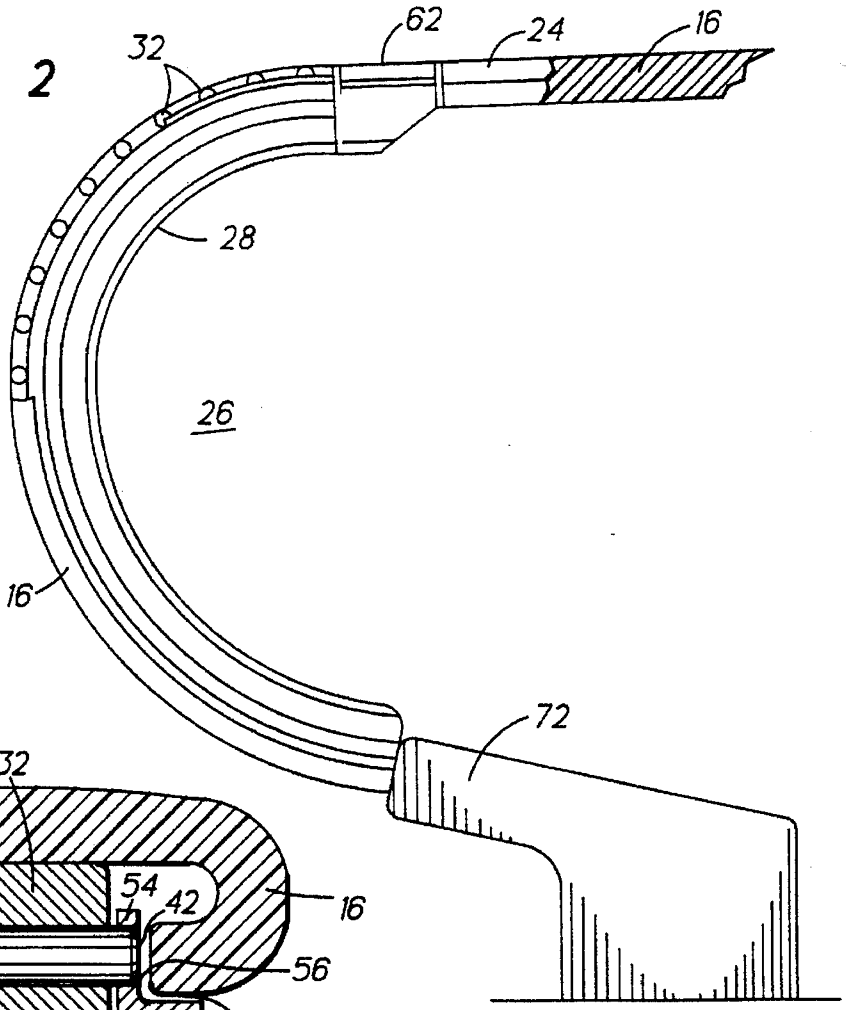
FIG. 3
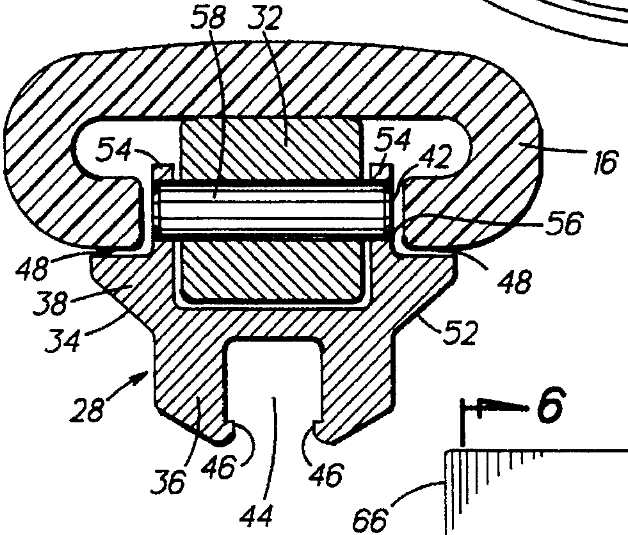
FIG. 4
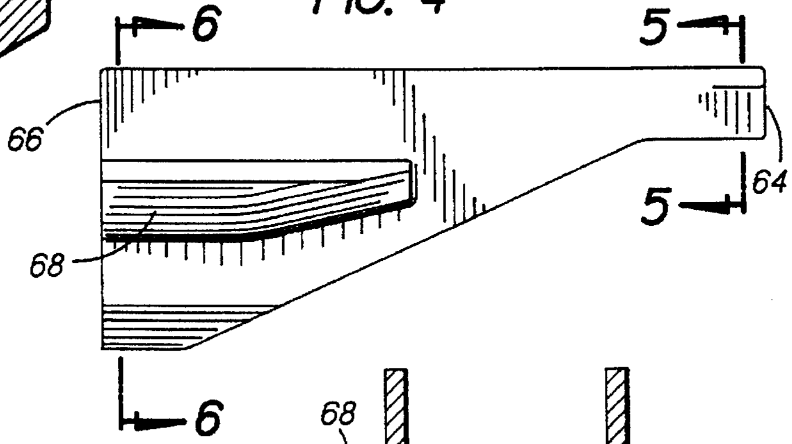
FIG. 5
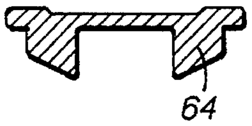
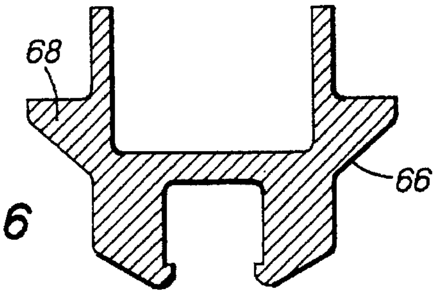
FIG. 6

NEWEL GUIDE FOR A HANDRAIL

TECHNICAL FIELD

This invention relates to passenger conveyors, and more particularly to balustrade newel guides for such conveyors.

BACKGROUND OF THE INVENTION

Passenger conveyors, such as escalators and moving walks, typically include a continuous loop of sequentially connected treadplates, a pair of handrails and a pair of balustrades extending along side the treadplates, and a drive system. The treadplates may be steps (escalators) or flat pallets (moving walks). The drive system includes a drive sprocket engaged with a pair of step or pallet chains that are connected to the treadplates. The drive system also provides the motive force for the handrails as they rotate about the balustrades.

The balustrade typically includes a linear section that extends the length of the conveyor and a pair of newels that extend beyond the ends of the conveyor. The newels provide means to extend the handrails into the areas in which the passengers are entering or exiting the conveyor and contribute to the safety of the conveyor. A typical newel is curved to permit the handrail to reverse direction for the return to the opposite end of the conveyor.

The balustrade includes a handrail guide that retains the handrail to the balustrade. The handrail engages in sliding contact with the handrail guide. The newel includes a newel guide for supporting and guiding the handrail around the newel. The tensioned handrail exerts the maximum contact force on the newel because of the reversal in direction. To accommodate the forces associated with the reversal in direction of the tensioned handrail, the newel guide includes a plurality of rollers that define a rolling contact surface for the handrail.

Assembly of the balustrade is a labor intensive process. The conventional newel guide is formed from sheet metal and includes a channel for supporting the rollers, a second channel to engage the balustrade, and a plurality of plastic deflectors. The channels are bonded together by spot welding and then deformed to approximate the shape of the newel. The second channel is then bored to fasten it to the newel, which is typically a glass panel. Finally, the plastic deflectors are fastened to the channels by screws and bonded to the newel. Due to the curved edge of the newel, the assembly of the newel guide to the newel may require extensive rework to get the pieces to fit together properly.

The above art notwithstanding, scientists and engineers under the direction of Applicant's Assignee are working to develop balustrades that are sturdy and that are inexpensive to manufacture and assemble.

DISCLOSURE OF THE INVENTION

According to the present invention, a newel guide includes an integral body incorporating means to attach the newel guide to the newel, a deflecting surface, and means to support the plurality of rollers.

The feature of the integral body reduces the number of parts that have to be manufactured and also minimizes the amount of rework that has to be done to assemble the newel guide onto the balustrade. Only one piece has to be shaped into the proper curvature for the newel. In addition, having an integral body permits the newel guide to be formed by an extrusion process, which minimizes the manufacturing expense.

In a particular embodiment of the present invention, the attachment means of the newel guide is a slot sized to fit over the newel such that an interference fit occurs when the newel guide is pressed onto the newel. The interference fit grips the newel. A gasket may be used between the slot and the newel to increase the gripping of the newel.

The one-piece newel guide and the slot result in a newel guide that is easy and inexpensive to assemble. The method of assembly includes the steps of bending the newel guide to a curved shape complementing the newel and press fitting the newel guide onto the newel. Having a single piece minimizes the amount of rework required to fit the newel guide to the newel and the interference fit eliminates the boring required to attach the newel guide.

In another particular embodiment, a transition piece is positioned between the newel guide and the handrail guide. The transition piece has a first end that mates with the newel guide and a second end that mates with the handrail guide. The advantage of the transition piece is a smooth passing from the handrail guide to the newel guide without any abrupt discontinuities. Further, the transition piece avoids having any openings or cavities for foreign objects to penetrate.

The foregoing and other objects, features and advantages of the present invention become more apparent in light of the following detailed description of the exemplary embodiments thereof, as illustrated in the accompanying drawings.

BRIEF DESCRIPTION OF THE DRAWINGS

FIG. 2 is a side view of the newel, partially cut-away to show the newel guide.

FIG. 3 is a cross-sectional view of the newel guide.

FIG. 4 is a side view of a transition piece.

FIG. 5 is a view of the transition piece taken along line 5—5 of FIG. 4.

FIG. 6 is a view of the transition piece taken along line 6—6 of FIG. 4.

BEST MODE FOR CARRYING OUT THE INVENTION

Figure 1:
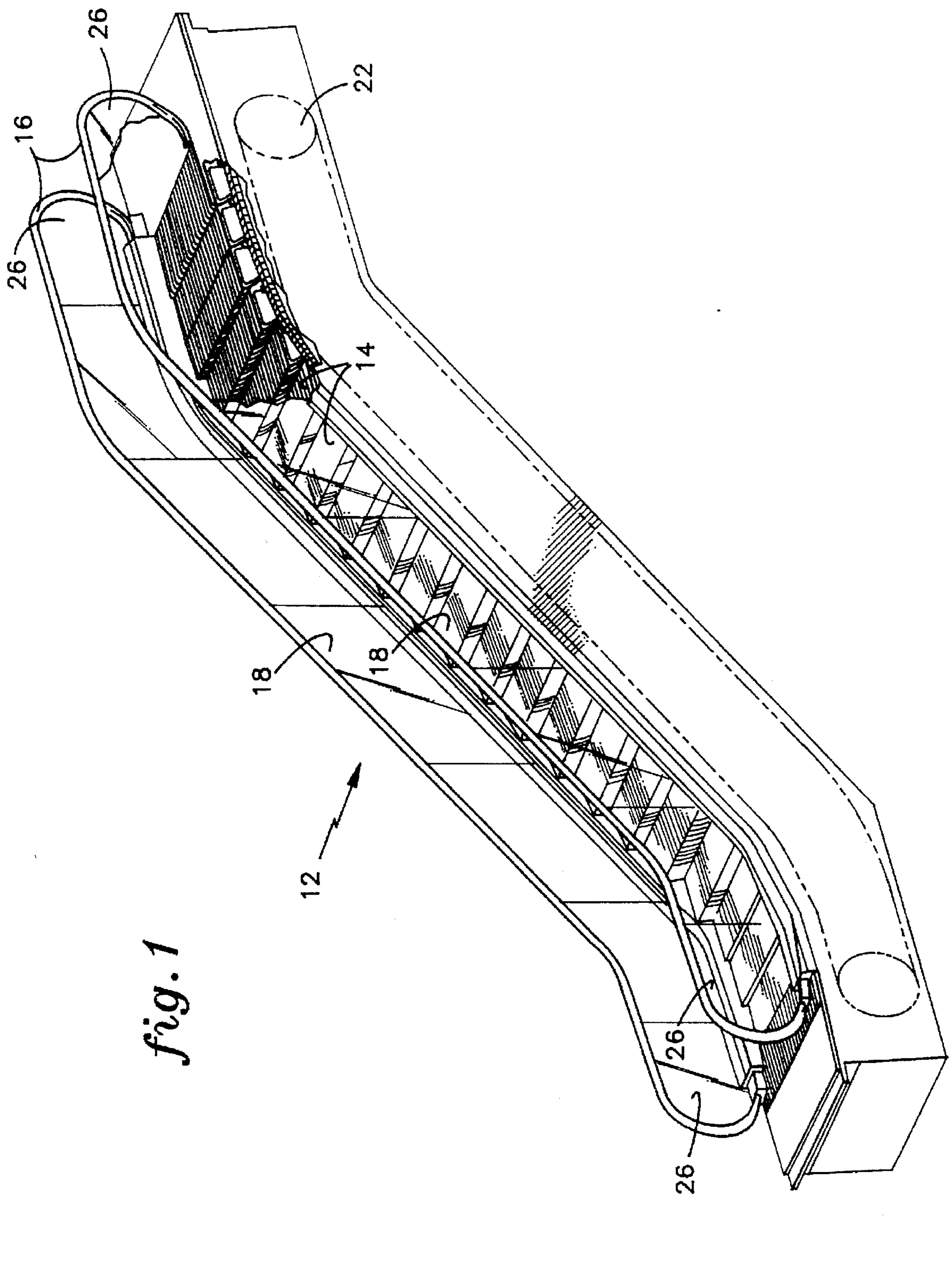
FIG. 1 is a side view of a passenger conveyor having a balustrade.

A passenger conveyor 12, illustrated as an escalator in FIG. 1, includes a continuous loop of steps or treadplates 14, a pair of handrails 16 and a pair of balustrades 18 extending along the side of the steps 14, and a drive system 22. The drive system 22 provides motive force for the steps 14 and for the handrails 16. The handrails 16 are slidingly engaged with a handrail guide 24 (see FIG. 2) disposed on the outer edge of each of the balustrades 18.

Each end of the balustrade 18 includes a rounded section that defines a newel 26. The rounded newel 26 extends beyond the exposed portion of the steps 14 and provides a turn around section for reversing the travel of the handrail 16 for the return trip.

The newel 26 is illustrated in more detail in FIG. 2. The newel 26 includes an integral, one-piece newel guide 28 mounted on the rounded edge of the newel 26 and a plurality of rollers 32 mounted on the newel guide. The newel guide 28 as shown in FIG. 3 includes an integral body 34 having an attachment portion 36, a deflector portion 38, and a roller mounting portion 42.

The attachment portion 36 defines means to attach the newel guide 28 to the newel 26 and includes a slot 44 sized to fit over the rounded edge of the newel 26 and a pair of opposing lips 46 directed into the slot 44. The slot 44 and lips 46 engage the newel 26 in an interference fit that results in the attachment portion 36 gripping the newel 26 without the need for fasteners or bonding. As is conventional, a compressible gasket may be placed between the newel guide 28 and the newel 26 to increase the friction between the mating surfaces.

The deflector portion 38 extends outward from the body 34 and overlaps the inner edges 48 of the handrail 16. The deflector portion 38 includes a deflector surface 52 that extends from the attachment portion 36 into close proximity to the handrail 16. The deflector surface 52 discourages foreign objects from being inserted between the newel guide 28 and the handrail 16.

The roller mounting portion 42 includes two supports 54 that extend upward from the body 34. Each of the supports 54 includes a plurality of apertures 56 for retaining roller pins 58 for the plurality of rollers 32. The roller mounting portion 42 defines means to support the plurality of pins 58 for rotation of the rollers 32.

The plurality of rollers 32 define the engagement surface for the handrail 16 to travel over in rolling contact. The rollers 32 are used to reduce the friction losses as the handrail 16 travels around the newel 26 since the handrail 16 is under tension.

A transition piece 62, as shown in FIG. 4–6, extends the end of the handrail guide 24 to the beginning of the newel guide 28. Since the handrail guide 24 and the newel guide 28 have different profiles, one end 64 of the transition piece 62 (see FIG. 6) has a profile mating with the handrail guide 24 profile and the opposite end 66 (see FIG. 5) has a profile mating with the newel guide 28 profile, including a deflector portion 68. The transition piece 62 is smoothly and gradually tapered between the differently profiled ends 64,66. This tapering eliminates any abrupt discontinuities between the handrail guide 24 and the newel guide 28 and further discourages the insertion of foreign objects between the newel guide 28 and the handrail 16.

During operation, the handrail 16 slides over the handrail guide 24, over the transition piece 62 and onto the rollers 32. Passengers riding the conveyor 12 may use the handrail 16 to hold onto and support themselves as they ride the conveyor 12. Passengers' fingers that are extended around the handrail 16 are urged away from the ends of the handrail 16 by the deflector portion 38 beginning in the transition piece 62 and extending around the body of the newel guide 28. The deflector portion 38 also minimizes the likelihood of damage occurring as a result of objects impacting the newel guide 28 and/or handrail 16 in the region immediately adjacent to the handrail entry box 72 (see FIG. 2). In this region, objects dropped by passengers entering or exiting the passenger conveyor 12 may impact with the portions of the handrail 16 extending outward from the newel 26. This impact could damage the handrail 16 and newel guide 28 or could disengage the handrail 16 from the newel guide 28. The deflector portion 38 reduces the possibility of damage by shielding the ends of the handrail 16 from such impact and by encouraging objects that contact the surface of the deflector portion 38 to deflect away from the newel 26 and handrail 16.

Manufacture of the newel guide 28 is simplified by having the single piece, integral body 34 incorporating the attachment means 36, the deflecting portion 38 and the roller support means 42. Since the integral body 34 is cross-sectionally uniform, the body 34 may be easily extruded to the length required. Such an extrusion process for forming the newel guide 28 may result in lower manufacturing costs.

Installation of the newel guide 28 involves the following steps. First, the extruded body 34 is bent into the particular shape of the newel 26 to which it is being applied. An advantage of using a single piece newel guide 28 is that separate pieces do not have to be shaped and then fit together. The latter process introduces errors due to mismatches between the separate pieces. The shaped newel guide 28 is then press fit onto the rounded edge of the newel 26, either with or without a gasket. Finally, the rollers 32 and pins 58 are mounted onto the newel guide 28. The transition piece 62 is positioned at the end of the newel guide 28 that is or will be adjacent the handrail guide 24 and press- fit onto the newel 26. Subsequently the handrail 16 may be installed onto the balustrade 18 in a conventional fashion.

Although the invention has been shown and described with respect to exemplary embodiments thereof, it should be understood by those skilled in the art that various changes, omissions, and additions may be made thereto, without departing from the spirit and scope of the invention.

What is claimed is:

1. A newel guide for a balustrade of a passenger conveyor, the balustrade extending along the length of the passenger conveyor and having a newel, a handrail, and a handrail guide, the newel guide including:

a plurality of rollers that define an engagement surface for the handrail, each of the rollers including a pin;

an integral body having means to attach the newel guide to the newel;

a deflecting surface; and means to support the plurality of pins for rotation of the plurality of rollers; and a transition piece mountable on the balustrade in a position between the integral body and the handrail guide, the transition piece having a first end that mates with the newel guide and a second end that mates with the handrail guide.

2. The newel guide according to claim 1, wherein the integral body is a one-piece structure formed by an extrusion process.

3. The newel guide according to claim 1, wherein the attachment means includes a slot sized to fit over the newel and a lip extending into the cavity formed by the slot such that an interference fit is produced between the attachment means and the newel to retain the newel guide to the newel.

4. A method to assemble a balustrade of a passenger conveyor, the balustrade extending along the length of the passenger conveyor and having a newel including a newel guide, a handrail encompassing the balustrade, the handrail rotating about the balustrade and in sliding engagement with a handrail guide attached to the balustrade, the newel guide including a plurality of rollers that define an engagement surface for the handrail, an integral body having a slot sized to fit over the newel and a lip extending into the cavity formed by the slot, and a transition piece having a first end that mates with the newel guide and a second end that mates with the handrail guide, the method including the steps of:

bending the newel guide to a curved shape complementing the newel;

press fitting the newel guide onto the newel; and positioning the transition piece between the newel guide and the handrail guide such that the first end is adjacent to the newel guide and the second end is adjacent to the handrail guide.

5. A balustrade for a passenger conveyor, the balustrade extending along the length of the passenger conveyor and having a handrail, a handrail guide, and a newel including a newel guide, the newel guide including:

a plurality of rollers that define an engagement surface for the handrail, each of the rollers including a pin; and an integral body having means to attach the newel guide to the newel;

a deflecting surface; and means to support the plurality of pins for rotation of the plurality of rollers; and a transition piece mountable on the balustrade in a position between the integral body and the handrail guide, the transition piece having a first end that mates with the newel guide and a second end that mates with the handrail guide.

6. The balustrade according to claim 5, wherein the integral body is a one-piece structure formed by an extrusion process.

7. The balustrade according to claim 5, wherein the attachment means includes a slot sized to fit over the newel and a lip extending into the cavity formed by the slot such that an interference fit is produced between the attachment means and the newel to retain the newel guide to the newel.

8. A passenger conveyor including a balustrade, the balustrade extending along the length of the passenger conveyor and having a handrail, a handrail guide, and a newel including a newel guide, the newel guide including:

a plurality of rollers that define an engagement surface for the handrail, each of the rollers including a pin; and an integral body having means to attach the newel guide to the newel;

a deflecting surface; and means to support the plurality of pins for rotation of the plurality of rollers; and a transition piece mountable on the balustrade in a position between the integral body and the handrail guide, the transition piece having a first end that mates with the newel guide and a second end that mates with the handrail guide.

9. The passenger conveyor according to claim 8, wherein the integral body is a one-piece structure formed by an extrusion process.

10. The passenger conveyor according to claim 8, wherein the attachment means includes a slot sized to fit over the newel and a lip extending into the cavity formed by the slot such that an interference fit is produced between the attachment means and the newel to retain the newel guide to the newel.

* * * * *